(12) United States Patent
Sharir

(10) Patent No.: US 7,267,235 B2
(45) Date of Patent: Sep. 11, 2007

(54) GREYWATER RECYCLING APPARATUS

(76) Inventor: Eitan Sharir, 3 Habrosh Street, P.O. Box 1009, Gan Yavne, 70800 (IL)

( * ) Notice: Subject to any disclaimer, the term of this patent is extended or adjusted under 35 U.S.C. 154(b) by 411 days.

(21) Appl. No.: 11/036,824

(22) Filed: Jan. 14, 2005

(65) Prior Publication Data

US 2005/0205479 A1    Sep. 22, 2005

(51) Int. Cl.
*B01D 35/027* (2006.01)
(52) U.S. Cl. .................. 210/413; 210/474; 210/109; 210/116; 210/121; 210/416.1; 210/258
(58) Field of Classification Search ............. 210/413, 210/474, 109, 116, 121, 416.1, 258
See application file for complete search history.

(56) References Cited

U.S. PATENT DOCUMENTS

| | | | | |
|---|---|---|---|---|
| 3,915,857 A | * | 10/1975 | Olson ..................... 210/668 |
| 4,197,597 A | * | 4/1980 | Toms ....................... 4/300 |
| 4,867,877 A | * | 9/1989 | Hansen et al. ........ 210/257.1 |
| 5,557,812 A | * | 9/1996 | Sayant ...................... 4/665 |
| 5,575,908 A | * | 11/1996 | Mondragon, Jr. ..... 210/257.1 |
| 6,004,470 A | * | 12/1999 | Abril ..................... 210/776 |

* cited by examiner

*Primary Examiner*—Thomas M. Lithgow
(74) *Attorney, Agent, or Firm*—Scully, Scott, Murphy & Presser, P.C.

(57) ABSTRACT

The invention provides a unitary device for converting an open-top container into a greywater recycling apparatus comprising a vessel lid having a submersible float switch-operated pump depending therefrom by extension means sized to enable the positioning of the pump adjacent the inner floor of a container to be covered by the lid, and further having an inlet pipe in fluid connection with a first primary filter means for removing coarse particles and fibers from greywater fed thereto, the first primary filter having an outlet feeding into a second fine filtering means, the filtering means being attached to the underside of the lid, the arrangement being such that after passing through the primary filter means and the fine filtering means, the filtered water falls under the influence of gravity to the bottom of the container to be pumped by the pump through an outlet provided in the lid.

8 Claims, 3 Drawing Sheets

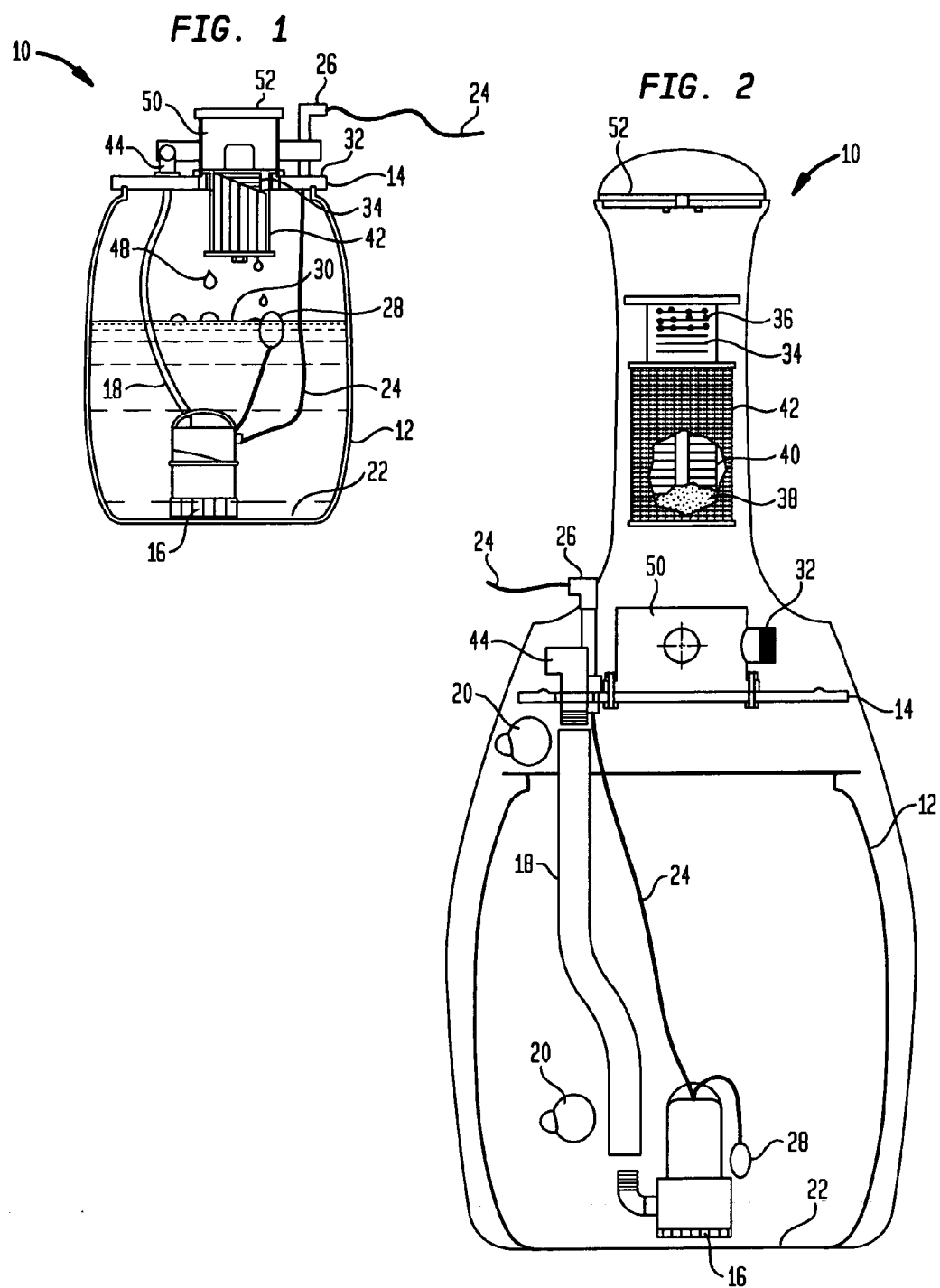

GREYWATER RECYCLING APPARATUS

The present invention relates to water recycling. More particularly, the invention provides an apparatus for filtering greywater particularly from residential buildings so that the output water may be used for irrigating gardens.

Water having been used for washing clothes or dishes and shower and bathwater is commonly referred to as greywater. In most houses greywater is discharged in a common waste pipe to mix with sewage, and the resultant effluent can be recycled only by use of complex and expensive purification procedures. With the increasing scarcity and cost of drinking quality water which is currently used for the irrigation of lawns and gardens, the collection of greywater separately becomes economically justified as the plumbing modifications required for the residence are of modest scope, and greywater can be converted and recycled for use as garden irrigation water. In developed areas the saving can reach 130-150 liter per person per day.

Much work has been done on the purification of seawater, of brackish water and of sewage effluent. However considering the growing importance of water conservation, surprisingly little effort has been devoted to the easier task of reclaiming greywater.

In U.S. Pat. No. 5,129,758 Lindström claims a method for distributing greywater to a soil bed while avoiding significant erosion by achieving a slow discharge rate from a pair of buried concentric tubes. A drawback of this arrangement is that there is no method of cleaning accumulated particulate matter from the inner tube.

A much more complex system is proposed by Ball et al. in U.S. Pat. No. 5,360,556. The disclosed method of feeding wastewater effluent to a filter bed through parallel conduits is focused on inhibiting undesirable biological growths and preventing filter clogging. The system is not compact and is more suited for commercial or farm use. Its installation is beyond what can be expected of the typical handyman and the system is unsuitable for the do-it-yourself market.

A liquid mixing apparatus for a greywater recycling system is disclosed in GB2336175 by Geddes. The described system is arranged for adding a chemical disinfectant to the water being processed. Such procedure however adds unnecessary cost and complexity and may even be harmful when the product water is intended for use in garden irrigation.

It is therefore one of the objects of the present invention to obviate the disadvantages of prior art systems for recycling greywater and to provide a unitary device which can be installed by the average handyman after the necessary plumbing modifications have been carried out to the residential building to prevent the inclusion of sewage in the feed-water.

It is a further object of the present invention to provide a device for converting greywater to irrigation water without the use of chemical additions.

Yet a further aim of the present invention is to provide an apparatus including means for removing particulates from the input side of the filter.

Yet a further object of the present invention is to offer a product package which is sufficiently compact to allow marketing in hardware and do-it-yourself shops.

The present invention achieves the above objects by providing a unitary device for converting an open-top container into a greywater recycling apparatus comprising a vessel lid having a submersible float switch-operated pump depending therefrom by extension means sized to enable the positioning of said pump adjacent the inner floor of a container to be covered by said lid, and further having an inlet pipe in fluid connection with a first primary filter means for removing coarse particles and fibers from greywater fed thereto, said first primary filter having an outlet feeding into a second fine filtering means, said filtering means being attached to the underside of said lid, the arrangement being such that after passing through said primary filter means and said fine filtering means, said filtered water falls under the influence of gravity to the bottom of said container to be pumped by said pump through an outlet provided in said lid.

In a preferred embodiment of the present invention there is provided a unitary device wherein said primary filter means and said fine filtering means are arranged as concentrically positioned conduits and wherein said greywater is fed to an area within said primary filter means from which it percolates outwardly towards said fine filtering means.

In a further embodiment of the unitary device said primary filter means is in the form of a plastic pipe having an outside diameter of about 110 mm and an inside diameter of about 100 mm.

According to the present invention the unitary device has primary filter means which can be cleaned in place by a manual brush positioned therein and arranged to be movable along the inner surfaces thereof.

In a further embodiment said primary filter means is provided with openings of about 1 mm.

Also, said fine filtering means is in the form of a pleated fine mesh concentrically positioned around said primary filter means. In a preferred embodiment said fine filtering means is a pleated fine filter having a surface area in excess of 3,000 $cm^2$.

Finally in a most preferred embodiment of the present invention there is provided a unitary device with an external overflow indicator.

It will thus be realized that the novel device of the present invention is sufficiently compact to allow marketing the unitary device as a single item in outlets selling building supplies, plumbing fixtures, home renovation items and in Do-it-yourself shops. Compactness is achieved because the large open-top vessel, typically about 220 liters capacity which is used for the storage of water which has been purified is excluded from the product package, the user having or obtaining the storage vessel elsewhere. It is of course feasible to also to offer for sale suitable vessels as a separate item, for the benefit of those users not having or obtaining such vessel themselves.

The device is built into a cover lid for the large vessel, which vessel is installed at a location low enough to allow inlet of greywater without need for a pump. A suitable arrangement is to install the vessel in a pit, thereby also improving the appearance of the surroundings.

A simple float-operated overflow indicator is provided so that the operator of the unit will realize that untreated greywater is being released by overflow. The usual cause of this situation is that the submersed pump has been switched off or requires servicing, or that one of the filters is clogged and requires cleaning or replacement. These matters are of course readily rectified.

Clogging of the fine filter is inhibited by first passing incoming greywater through a coarse primary filter and also by the use of a large-area fine filter. If the primary filter clogs its inlet face can be cleaned by use of a provided integral brush without dismantling any part of the device.

A further method of cleaning is to temporarily connect the immersion pump outlet to the filter outlet for reverse flow to dislodge accumulated solids from the filters.

When finally either filter is fully loaded it can be conveniently removed for cleaning or replacement.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

IN THE DRAWINGS

FIG. 1 is a sectional elevational view with part of the filter fragmented of a preferred embodiment of the device according to the invention;

FIG. 2 is an exploded detail view of the same embodiment showing further constructional details;

Figure 3:
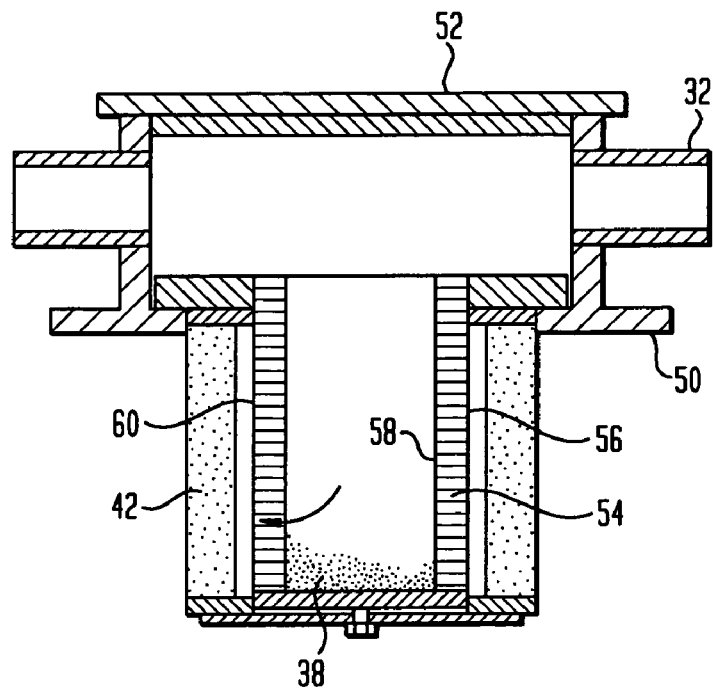
FIG. 3 is a more detailed view of the primary filter means.

There is seen in FIGS. 1 and 2 a unitary device 10 for converting an open-top container 12, typically of about 220 liter capacity, into a greywater recycling apparatus.

A vessel lid 14 supports a submersible float-switch operated pump 16 optionally depending therefrom by extension means (not shown) such as for example metal tubes. When used these are sized to enable the positioning of the pump 16 adjacent the inner floor of the container 12 to be covered by the lid 14. However In the embodiment shown a robust pump outlet hose 18 secured by clips 20 is relied upon to prevent undesired reaction revolution of the pump 16 which sits on the inner bottom surface 22 of the container 12.

An electric cable 24 passing through the lid 14 via a conduit 26 supplies power to the pump 16.

The float switch 28 activates the submersed pump 16 when the level of the purified water 30 rises to a set height, and cuts off power when the water level drops.

A greywater inlet pipe (not seen) is connected to the greywater inlet port 32 which is in fluid connection with a first primary filter 34. The primary filter is provided with openings 36 of about 1 mm.

The primary filter 34 removes coarse particles 38 and fibers from greywater fed thereto and stores these solids. As seen in FIG. 2, the filter 34 can be readily dismantled for cleaning and disposal of these accumulated solid debris 38.

The primary filter 34 has an outlet, which in the shown embodiments comprises the outer surface 40 thereof. The coarse-filtered water from the primary filter feeds directly into a fine filter 42, which is removably attached to the underside of the lid 14. Advantageously the primary filter 34 and the fine filter 42 are arranged as concentrically positioned conduits, as shown in the figures. Thus the greywater is fed to an area within the primary filter 34 from which it percolates outwardly towards and through the fine filter 42.

A preferred form of the fine filter is a stainless steel pleated fine mesh–80–120 mesh is suitable—having a surface area in excess of 3,000 $cm^2$, and being disposed concentrically around the primary filter 34.

The arrangement is such that after passing through the primary filter 34 and the fine filter 42, the purified water 48 falls under the influence of gravity to the bottom of the container 12.

Both filters 34, 42 are retained in a filter housing 50 having a removable cover 52.

When activated the pump 16 pumps the filtered water through outlet hose 18 which goes through an outlet 44 provided in the lid 14. The lid outlet 46 is connectable to the garden or lawn irrigation system (not seen), usually of the drip type.

With regard to the rest of the figures, similar reference numerals have been used to identify similar parts.

Referring now to FIG. 3, there is seen a detail of a unitary device wherein the primary filter is in the form of a plastic pipe 54 having an outside diameter 56 of about 110 mm and an inside diameter 58 of about 100 mm. A multiplicity of apertures, e.g. 1 mm wide elongated slots 60, act as a coarse filter to protect the fine filter 42 from clogging by larger solids 38.

Figure 4:
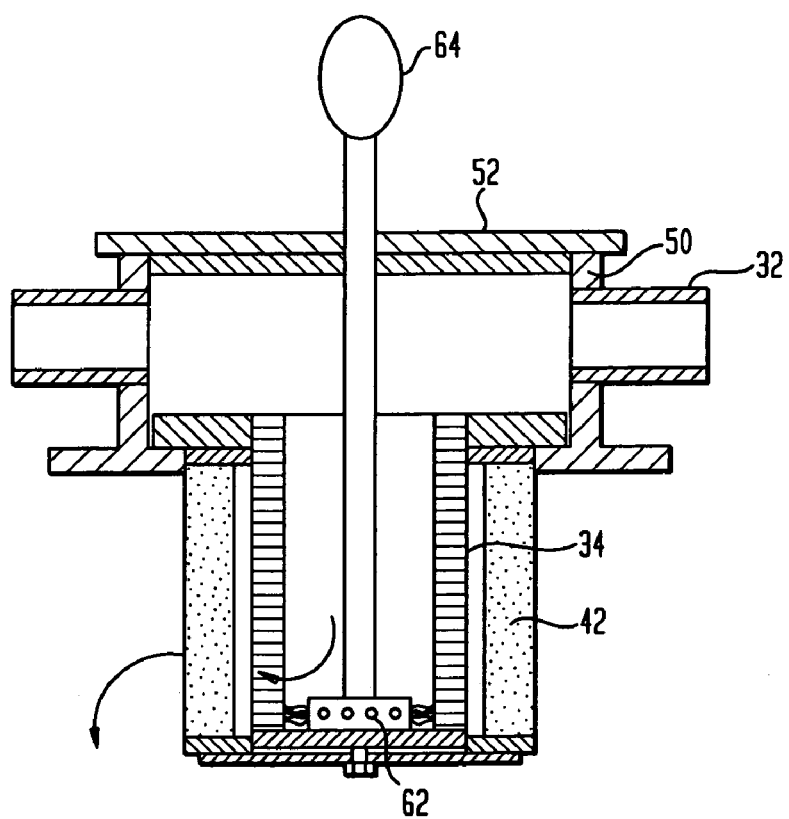
FIG. 4 is a detail view of an embodiment provided with cleaning means for the coarse filter.

FIG. 4 illustrates a detail of a unitary device wherein the primary filter 34 is cleanable on site without need for dismantling. A manually operatable brush 62 is positioned inside the primary filter 34 and is arranged to be manipulated over the inner surfaces thereof by means of a handle 64 projecting outside the filter housing 50.

Figure 5:
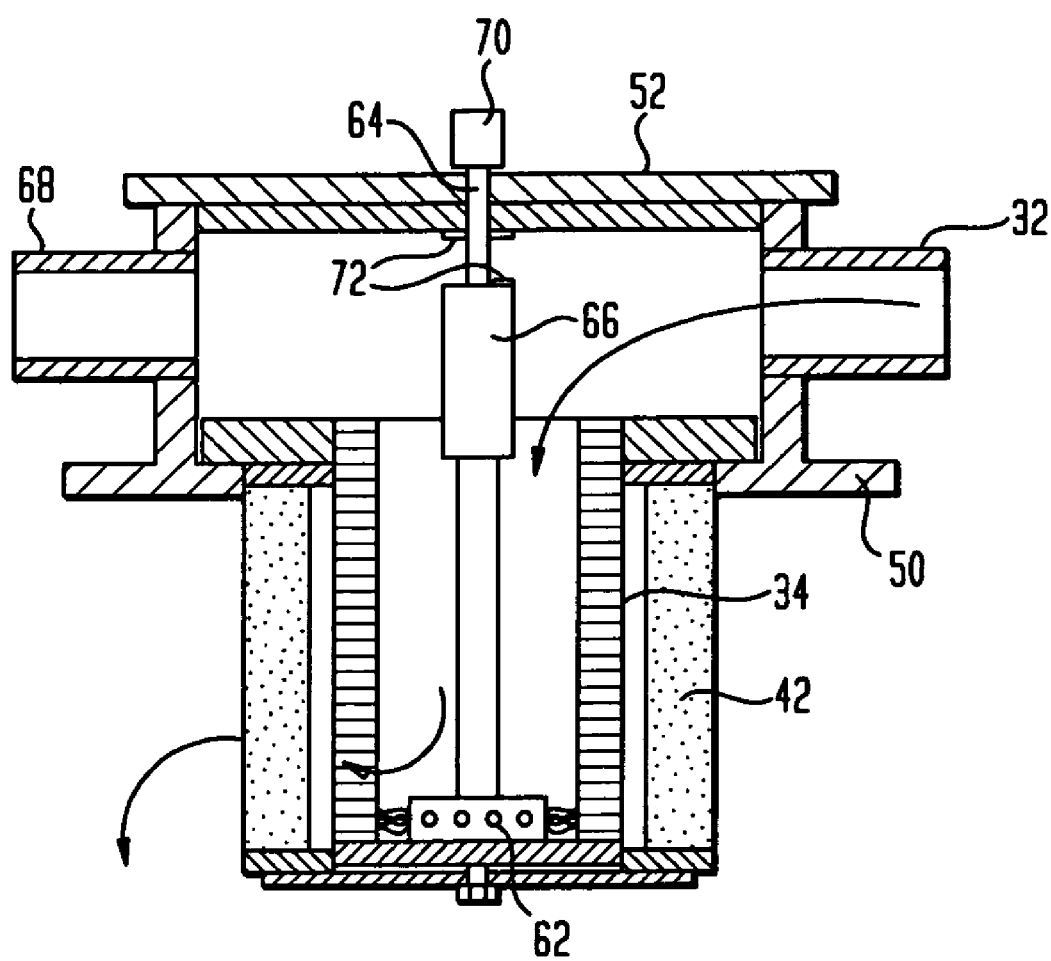
FIG. 5 is a detail view of the external overflow indicator.

Seen in FIG. 5 is a unitary device further provided with an external overflow indicator 64. The indicator 64 is operated by a float 66 which rises when water level approaches the overflow outlet 68 of the filter housing 50. On rising, the indicator externally displays a red surface 70 which warns the operator of the device that action is needed to prevent overflow. Such action could be checking that the submersible pump 16 is connected to power, or checking that the pump float switch 28, both seen in FIG. 1, is operative.

The overflow indicator 64 is preferably provided with retention means 72 temporarily preventing the float 66 from moving down in response to a drop in water level in the large container. This alerts the system operator that some servicing is required.

Retention means 72 can take the form of Velcro® tape as seen in the figure, a plastic bulbed extension entering a suitable recess, or a stainless steel spring catch.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A unitary device for converting an open-top container into a greywater recycling apparatus comprising a vessel lid having a submersible float switch-operated pump depending therefrom by extension means sized to enable the positioning of said pump adjacent the inner floor of a container to be covered by said lid, and further having an inlet pipe in fluid connection with a first primary filter means for removing coarse particles and fibers from greywater fed thereto, said first primary filter having an outlet feeding into a second fine filtering means, said filtering means being attached to the underside of said lid, the arrangement being such that after passing through said primary filter means and said fine filtering means, said filtered water falls under the influence of gravity to the bottom of said container to be pumped by said pump through an outlet provided in said lid.

2. A unitary device according to claim 1 wherein said primary filter means and said fine filtering means are arranged as concentrically positioned conduits and wherein said greywater is fed to an area within said primary filter means from which it percolates outwards towards said fine filtering means.

3. A unitary device according to claim 1 wherein said primary filter means is in the form of a plastic pipe having an outside diameter of about 110 mm and an inside diameter of about 100 mm.

4. A unitary device according to claim 1 wherein said primary filter means is cleaned in place by a manual brush positioned therein and arranged to be movable along the inner surfaces thereof.

5. A unitary device according to claim 1 wherein said primary filter means is provided with openings of about 1 mm.

6. A unitary device according to claim 1 wherein said fine filtering means is in the form of a pleated fine mesh concentrically positioned around said primary filter means.

7. A unitary device according to claim 1 wherein said fine filtering means is a pleated fine filter having a surface area in excess of 3,000 $cm^2$.

8. A unitary device according to claim 1 further provided with an external overflow indicator.

* * * * *